United States Patent [19]
Denkin et al.

[11] Patent Number: 5,699,081
[45] Date of Patent: Dec. 16, 1997

[54] APPARATUS AND METHOD FOR AUTOMATICALLY PROVISIONING POWER ON A PER CHANNEL BASIS IN A COMMUNICATIONS TRANSMISSION SYSTEM

[75] Inventors: Nathan Myron Denkin, Aberdeen; Daniel A. Fishman, Lakewood, both of N.J.

[73] Assignee: Lucent Technologies Inc., Murray Hill, N.J.

[21] Appl. No.: 720,279

[22] Filed: Sep. 26, 1996

[51] Int. Cl.$^6$ ..................................... H01S 3/00
[52] U.S. Cl. .................. 359/341; 354/124; 354/160
[58] Field of Search .......................... 359/124, 134, 359/160, 161, 176, 177, 341

[56] References Cited

U.S. PATENT DOCUMENTS 5,463,487  10/1995  Epworth .................... 359/124

*Primary Examiner*—Mark Hellner
*Attorney, Agent, or Firm*—F. B. Luludis

[57] ABSTRACT

A facility in a communication system associates a unique identification signal with each currently active communications channel and then transmits the unique identification signal and associated information signals within the respective channel. In this way, apparatus that receives the transmitted signals may determine the number of channels that are active based on the number of the identification signals it receives and then output the received signals at a power level determined as a function of that number.

3 Claims, 3 Drawing Sheets

| # OF EQUIPPED CHANNELS | Po (dBm) |
|---|---|
| 0 | 11.9 |
| 1 | 12.4 |
| 2 | 12.4 |
| 3 | 13.7 |
| 4 | 14.5 |
| 5 | 15.2 |
| 6 | 15.7 |
| 7 | 16.0 |
| 8 | 16.0 |

APPARATUS AND METHOD FOR AUTOMATICALLY PROVISIONING POWER ON A PER CHANNEL BASIS IN A COMMUNICATIONS TRANSMISSION SYSTEM

TECHNICAL FIELD

The invention relates to communications transmission systems and more particularly relates to dynamically provisioning output power on a per channel basis at an optical element disposed within a communications transmission system.

BACKGROUND OF THE INVENTION

The level of power that an optical signal amplifier outputs to an optical fiber on a per channel basis needs to be carefully controlled to prevent overpowering the optical channel. Such overpowering typically causes the system to degrade as a result of so-called self-phase modulation which is induced by a non-linear fiber response in the optical channel. This problem is especially acute in an optical transmission system spanning an appreciable distance and employing a number of optical amplifiers to regenerate the optical signals at various points along the transmission system. For example, if a system has a single optical channel, then an optical amplifier, in response to receipt of an optical signal via that channel, may inject a relatively strong optical signal, e.g., a 16 dBm signal, into the associated optical fiber. It is likely then that the strong optical signal will cause the fiber to respond nonlinearly and thus severely degrade signals that are being transported over that channel.

This problem may be dealt with by decreasing the level of power that an optical amplifier outputs to an optical fiber and increasing the number of optical channels such that the output power is evenly distributed across the channels. For example, if the number of channels is increased to two (four, six, etc.), then the level of power is distributed such that an approximately 13 (10, 8, etc.) dBm signal is outputted to each channel. Accordingly, then, the level of power that an optical amplifier outputs to an optical channel is set corresponding to the number of optical channels that is transported over the associated optical fiber. Disadvantageously, such setting of signal levels has to be done manually at each optical amplifier along a fiber—which means that the number of such channels cannot change dynamically on the fly without causing some level of degradation in the performance of the associated optical system. Also, setting the power level too low will cause errors in the received signal.

SUMMARY OF THE INVENTION

We deal with the foregoing problems and advance the relevant art, in accordance with the invention, by identifying a unique identification signal for each of a plurality of currently active communications channels and transmitting the unique identification signal and associated information signals within the respective channel such that apparatus which receives the transmitted signals may determine the number of channels that are active as a function of the presence of the identification signals and output the received signals at a power level determined as a function of said number.

These and other aspects of the claimed invention will be appreciated from the ensuing detailed description and accompanying drawings.

DETAILED DESCRIPTION

In an illustrative example of the invention, a wavelength multiplexed optical signal composed of a number of individual optical component signals, e.g., four signals, having respective wavelengths of $\lambda_1$, $\lambda_2$, $\lambda_3$ and $\lambda_4$, is transmitted from a source to a receiver via an optical transmission line. Each such component is modulated in a conventional manner, e.g., amplitude modulated, with a respective predetermined tone signal, $f_1$, $f_2$, $f_3$ and $f_4$. (The way in which such tones are generated is discussed below in conjunction with FIG. 5.) In general and in accord with an aspect of the invention, an optical amplifier disposed along the transmission line dynamically determines the number of such tone signals that are contained in an optical signal that is received at an input to determine the number of optical channels that are currently active. The optical amplifier then automatically sets the level output power per channel as a function of that number, in accord with an aspect of the invention.

Figure 1:
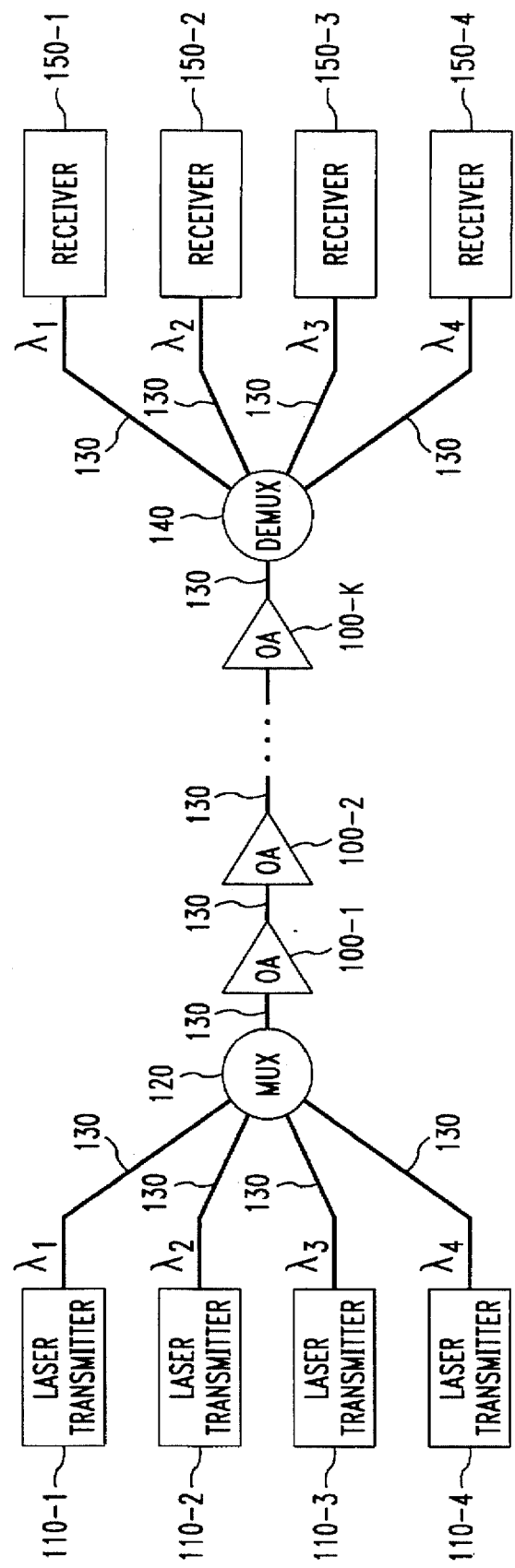
FIG. 1 is a broad block diagram of an optical transmission system embodying the principles of the invention.

An illustrative optical system embodying the principles of the invention is shown in simplified form in FIG. 1. The optical system, more particularly, includes four laser transmitters 110-1 through 110-4, multiplexer 120, a plurality of optical amplifiers disposed along optical transmission path 130, demultiplexer 140 and optical receivers 150-1 through 150-4. Each such transmitter outputs a respective information bearing optical signal having a unique wavelength, $\lambda_i$. Such a signal is destined for one of the receivers 150-1 through 150-4. That is, a laser transmitter 110$i$ modulates information with the optical signal, $\lambda_i$, that it generates. For the present discussion, it is assumed that transmission system has four optical channels respectively associated with transmitters 110-1 through 110-4. The four channels are identified by their respective wavelengths, $\lambda_1$, $\lambda_2$, $\lambda_3$ and $\lambda_4$, which are sufficiently separated from one another to prevent signals in adjacent channels from interfering with one another. Such separation may be, for example, 200 GHz.

A transmitter 110$i$ also modulates the optical signal that it generates with a unique tone so that, in accord with an aspect of the invention, when the resulting signal is received by an optical amplifier 100$j$ the amplifier may automatically determine the number of active channels and dynamically adjusts the output power per channel as a function of that number.

Figure 2:
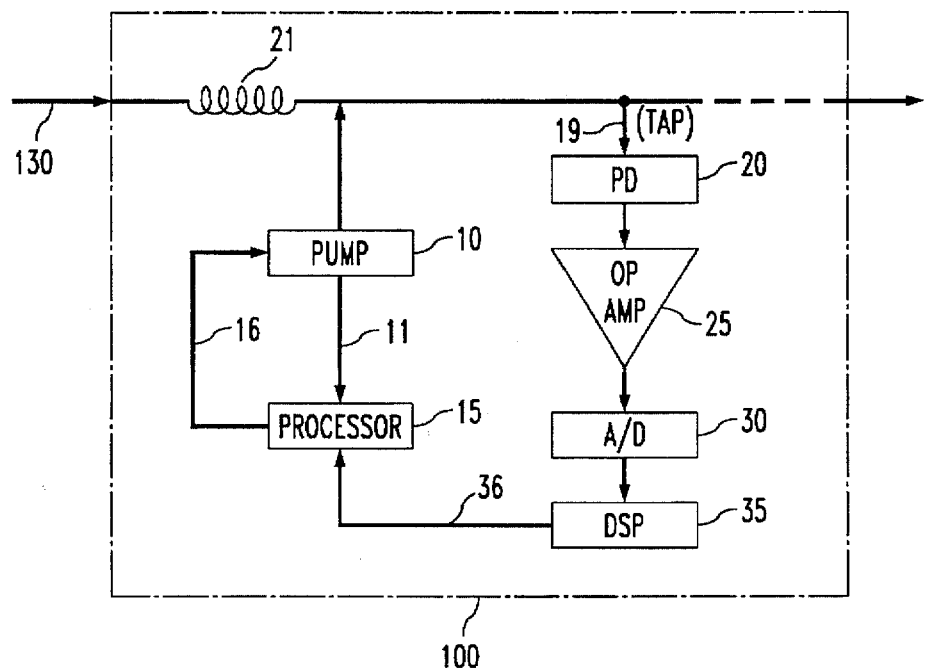
FIG. 2 is broad block diagram of an optical amplifier of FIG. 1 arranged in accordance with the principles of the invention.

A simplified diagram of an optical amplifier 100$j$ arranged in accord with the principles of the invention is illustrated in FIG. 2. Specifically, PhotoDiode (PD) 20 connects to optical path 130 via a conventional low-level optical tap 19, e.g., a splitter, for the purpose of sampling the signals traveling over fiber 130, Such sampling is limited to a small portion/fraction of the optical power contained in fiber 130. PD 20 thus converts optical signals received via tap 19 into electrical signals and supplies the latter signals to Operational Amplifier 25. Op Amp 25, in turn, filters the tone band (i.e., the frequency band assigned to the tones) and then adjusts the gain of the filtered signal so that it may be properly processed by Analog/Digital (A/D) converter 30. A/D converter 30 in a conventional manner converts the analog signals that it receives from Op Amp 25 into corresponding digital signals and supplies the result to conventional Digital Signal Processor 35. DSP 35, in turn, processes the received signals in accordance with the well-known Fast Fourier Transform algorithm to convert the signals received from A/D converter 30 from the time domain to the frequency domain. DSP 35 thus generates a spectrum of distinct signals (vectors) in amplitude versus frequency form in which a distinct signal (vector) represents a respective one of the aforementioned tones. DSP 35 then counts the number of distinct signals present in the Fourier transform of the inputted digital signal and supplies that number as the number of active channels to conventional processor 15 via lead 36.

It is seen from the FIG. that a feedback loop formed by paths 16 and 11 interconnects processor 15 and pump laser 10. Pump laser 10 excites the atoms that are in fiber section 21. An incoming light signal stimulates the atoms causing them to "relax" which results in an emission of a light signal.

Thus, the level of the optical signals that are traveling via path 130 and section 21 (and, therefore, the output power level) may be controlled by the level of ions that pump 10 injects into fiber 130 (i.e., output power of pump 10). It can also be appreciated then that the level of power outputted by pump 10 may be controlled as a function of the number of active channels that are detected by DSP 35. (It is noted that the dashed line shown in FIG. 2 represents other circuitry associated with optical amplifier 100 but not explicitly shown in the FIG.)

Figure 3:
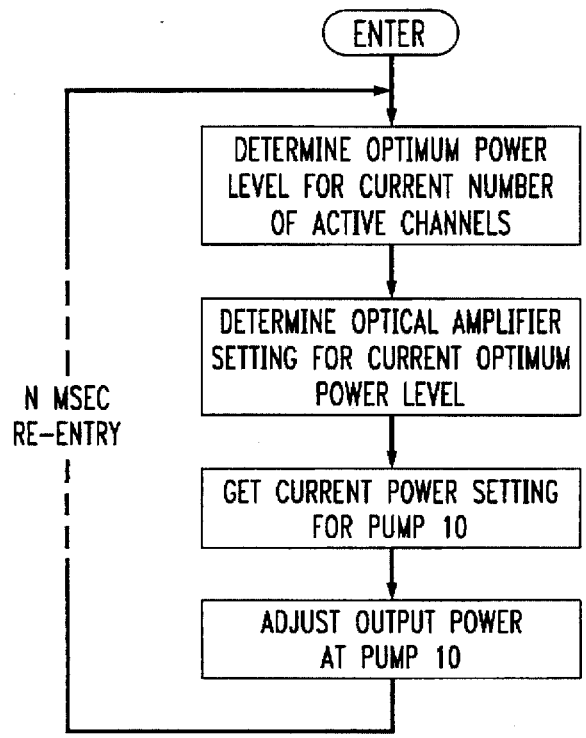
FIG. 3 illustrates in flow chart form the program which implements the principles of the invention in the processor of FIG. 2.
Figures 4, 5:
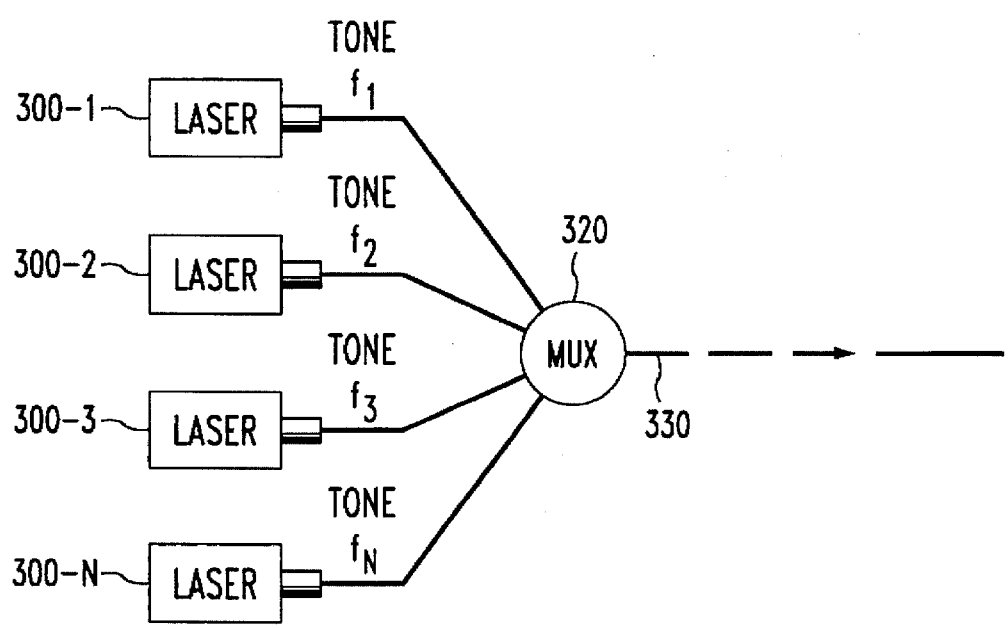
FIG. 4 shows a correspondence between the number of active channels and the output power at an optical amplifier.
FIG. 5 illustrates the way in which a particular tone signal is associated with a particular optical channel.

Specifically, and referring now to both FIGS. 2 and 3. The program which implements the principles of the invention in processor 15 is entered at block 300 on a scheduled bases, e.g., once every 100 milliseconds. When so entered, the program (301), using the number of channels that are currently active as an index, unloads an optimum power value from a table stored in associated memory. (An example of such a table is shown in FIG. 4.) The program (block 302) then determines an output setting that may be applied to pump 10 via lead 16 to reach the optimum power level characterized by the value that was just unloaded from the table of FIG. 4. The program then determines the current power setting for pump 10 to determine if the pump 10 output power needs to be increased or decreased. The current setting is based on a predetermined ratio between the level of the signal that received via lead 11 and the pump 10 output power to fiber 130. (That is, the level of the signal on lead 11 is a predetermined fraction (ratio) of the level of the pump 10 output power.) The program then adjusts the pump 10 output power by applying the appropriate ratio setting to pump 10 via lead 16. The program monitors the signal on lead 11 and, in turn, adjusts the setting until the pump 10 output power reaches the desired optimum power level for the current number of active channels, all in accordance with the principles of the invention.

FIG. 5 illustrates the tone generation that is done at the transmitting end of an optical transmission system arranged in accord with the principles of the invention. Specifically, laser transmitters 300-1 through 300-N generate optical signals having predetermined wavelengths, for example, 1550.7, 1554, 1556.8, 1559.1 . . . nm, respectively. Such signals are modulated by modulators (not shown) to carry information (data) supplied by external data sources (not shown). Each laser transmitter 300i is modulated, in accord with an aspect of the invention, with a specific tone $f_1$ through $f_n$, respectively. One such modulation technique, for example, uses a sine waveforms of frequencies $f_i$ to dither the bias current of a respective one of the laser transmitters 300i.

The foregoing is merely illustrative of the principles of the invention. Those skilled in the art will be able to devise numerous arrangements, which, although not explicitly shown or described herein, nevertheless embody those principles that are within the spirit and scope of the invention.

For example, although the claimed invention was discussed in the context of using tones to identify the number of active channels active, it is clear that other identification/tagging techniques may be used instead. For example, unique digital addresses or different phases may be used instead of tones. It is also clear that the claimed invention may be practiced in transmission systems other than optical transmission systems.

We claim:

1. Transmission apparatus for automatically provisioning power on a per channel basis in a communications transmission system comprising apparatus for generating a unique identification signal for each of a plurality of communications channels that are currently active and for transmitting the unique identification signal and associated information signals within the respective one of said channels over a communications path common to said channels, apparatus disposed in the communications path for receiving the transmitted signals and converting a portion of the received signals to analog electrical signals and then converting the analog signals to digital signals, said apparatus including digital processing apparatus for converting said digital signals from a time domain to a frequency domain to identify which of such identification signals are present, and setting said output power level as a function of the number of identification signals so present.

2. The apparatus of claim 1 wherein the transmitted signals are optical signals and wherein said apparatus further comprises a processor, responsive to the determination of the number of identification signals present, for indexing a table of power values using said number and unloading a power value setting from the accessed location, and an optical pump, said processor controlling, as a function of the unloaded power value setting, an input to the optical pump as a way of causing said optical pump to change the power level of the transmitted optical signals to correspond with a power level specified by the unloaded power level setting.

3. An optical amplifier comprising apparatus for receiving optical signals from an optical transmission path, said optical signals being associated with respective signal channels identified by respective identification signals, apparatus for converting a portion of the received optical signals to digital signals, transforming the resulting digital signals from a time domain to a frequency domain in accordance with a predetermined transform, and for processing the transformed result to identify the number of said identification signals present in said optical signals, apparatus for selecting from a table of power values settings a power value setting associated with said number, and for controlling an associated optical pump until the level of the received optical signals corresponds with the unloaded power value setting and outputting the amplified result to a communications path.

\* \* \* \* \*